No. 662,404.  
E. R. EDSON.  
PROCESS OF EXTRACTING OIL.  
(Application filed Dec. 4, 1899.)
Patented Nov. 27, 1900.
(No Model.)
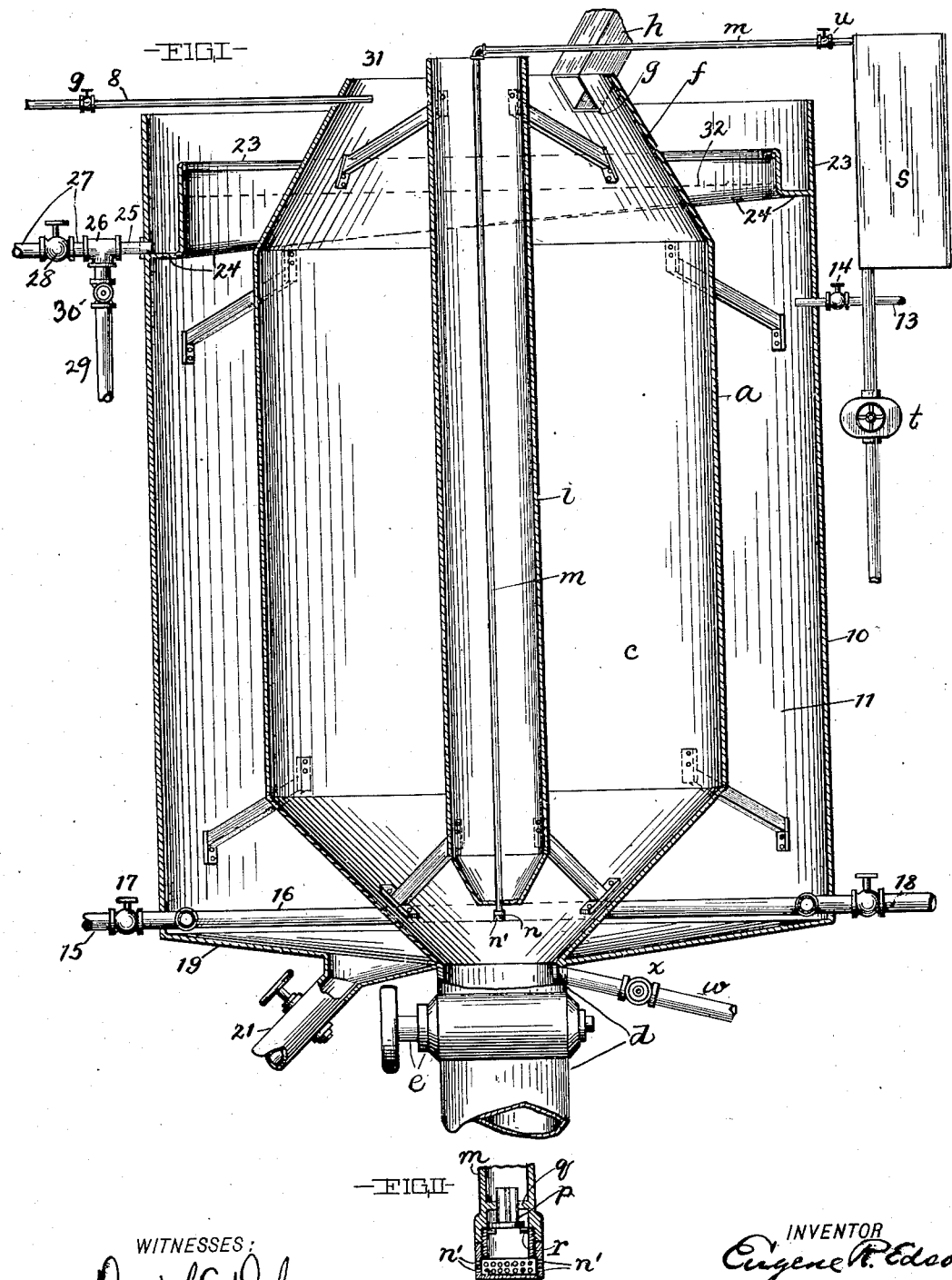

UNITED STATES PATENT OFFICE.

EUGENE R. EDSON, OF CLEVELAND, OHIO, ASSIGNOR TO THE BUCKEYE FISH COMPANY, OF SAME PLACE.

PROCESS OF EXTRACTING OIL.

SPECIFICATION forming part of Letters Patent No. 662,404, dated November 27, 1900.

Application filed December 4, 1899. Serial No. 739,105. (No specimens.)

*To all whom it may concern:*

Be it known that I, EUGENE R. EDSON, a resident of Cleveland, county of Cuyahoga, and State of Ohio, have invented certain new and useful Improvements in the Production of Oil from Fish or Parts of Fish; and I do hereby declare the following to be a full, clear, and exact description of the invention, such as will enable others skilled in the art to which it pertains to make and use the same.

This invention relates to improvements in producing pure or substantially pure oil from fish or from the oil-containing parts of fish or other oil-containing material.

The object of this invention is to obtain a high-grade oil of the character indicated at less cost and avoid the conversion of the oil extracted from the material undergoing treatment into an emulsion and prevent other injury to or deterioration of the oil.

With this object in view the invention comprises certain steps and peculiarities and combinations of steps hereinafter described, and pointed out in the claims.

The accompanying drawings illustrate apparatus suitable for carrying out my improved process.

Figure I of the said drawings is a side elevation, mostly in central vertical section, of the said apparatus. Fig. II is a side elevation, partly in section, of the lower end portion of the pipe employed in conducting air into the lower portion of the mass of material undergoing treatment.

Referring to the drawings, $a$ designates an upright tank or receptacle into which the fish or parts of fish that are to be treated are introduced. The tank or receptacle $a$ has its lower end provided with a discharge pipe or outlet $d$, with which the chamber $c$ of the receptacle $a$ communicates. The outlet $d$ constitutes the receptacle's outlet for the guano-forming residue and is provided with a valve $e$ for interrupting and establishing communication from the chamber $c$ through the pipe or outlet $d$.

The upper portion of the tank or receptacle $a$ is gradually reduced diametrically toward the receptacle's upper extremity. The receptacle $a$ is open at the upper end of its upper conical portion $f$, that is provided with the lateral aperture $g$, with which the feed-spout $h$ communicates. The feed-spout $h$ is in open relation, therefore, with the chamber $c$ of the receptacle $a$, preferably at the upper end of the upper conical portion $f$ of the receptacle.

The tank or receptacle $a$ is provided centrally with a vertically-arranged or upright core $i$, that extends, preferably, from a short distance above the upper conical portion of the said receptacle into the lower portion of the receptacle. The core $i$ is closed at its lower end and is supported from the shell of the receptacle $a$ in any approved manner.

The core $i$ is hollow and a pipe or pipe-line $m$ for conducting air under pressure into the lower portion of the chamber $c$ of the receptacle $a$ extends vertically and centrally through the said core and is provided within its lower end with a check-valve $p$, as shown in Fig. II, and with a seat $q$ for the inner end of the valve and with a stop-forming flange or lug $r$ for limiting the outward movement of the valve. The valve $p$ is free to move, therefore, in the direction required to establish open relation between the pipe $m$ and the chamber $c$ of the receptacle $a$ by any pressure within the said pipe $m$, but is closed and retained closed by the pressure within the chamber $c$ when there is no pressure in the pipe $m$ or when the pressure in the pipe $m$ becomes less than the back pressure within the chamber $c$. The pipe $m$ below the path of the check-valve is provided with a cap or head $n$, that has numerous lateral perforations or orifices $n'$, and forms an annular screen that prevents ingress of solid material from the chamber $c$ into the pipe $m$ and causes the air discharged from the pipe $m$ to be equally distributed in all directions laterally within the said chamber $c$. The pipe $m$ extends outside of the receptacle $a$ a suitable distance and is in open relation at its outer end with the chamber of a tank $s$, wherein air under pressure is stored and supplied by a suitably-operated pump $t$, that has its outlet connected with the tank $s$ in any approved manner and has its inlet communicating with the external atmosphere. The pipe $m$ at any suitable point between the tank s and the core i is provided with a valve u for regulating the supply of air under pressure to the chamber c.

The outlet d of the receptacle a is provided with a valved drain-pipe w for draining from the said receptacle any gelatin solution accumulating within the receptacle a, and the passage-way from the chamber c through the pipe w is controlled by the valve x, with which the said pipe is provided.

The provision of the core i centrally of the receptacle a renders the form of the chamber c annular around the said core. The annular form of chamber c is important to prevent solidifying or caking of the mass within the receptacle. If the core were omitted, the material undergoing treatment within the receptacle a would have a tendency to gather and cake into a solid mass within the central portion of the receptacle. The presence of the core i prevents such a caking or gathering of the material.

A valved water-supply pipe 8 is arranged to discharge into the upper end of the receptacle a.

The tank or receptacle a is arranged centrally of a vertically-arranged or upright tank 10, that is larger diametrically than the receptacle a, so as to form an annular chamber 11, surrounding the said receptacle a. The tank 10 extends from the lower end of the receptacle a upwardly to near the upper end of the upper conical portion f of the receptacle a. The tank 10 is supported in any approved manner, and the receptacle a is suitably supported from and internally of the tank 10.

A water-supply pipe 13 extends and discharges into the chamber 11 of the tank 10 below a trough 23, formed internally of the upper portion of the said tank. The pipe 13 has a valve 14 for controlling the supply of water to the chamber 11.

A steam-supply pipe 15 extends into the lower end of the chamber 11 and there terminates in a coil 16, employed in heating the water supplied to the said chamber. The pipe 15 is provided with a valve 17 for controlling the supply of steam to the coil 16, and the coil 16 is provided, preferably, with a valved drain-pipe 18.

The bottom 19 of the chamber 11 declines toward the lower end of the receptacle a, and the chamber 11 at the lower portion of the bottom 19 is in open relation with the valved drain-pipe 21.

As already indicated, a trough 23 is formed internally of and upon the upper portion of the tank 10 a suitable distance above the water-supply pipe 13. The trough 23 is arranged only above the outer portion of the water-receiving chamber 11 of the tank 10, and consequently the said chamber extends upwardly between the trough and the upper conical portion of the tank or receptacle a. The bottom 24 of the trough declines toward the trough's outlet that is formed by a short pipe 25, that has its inner end communicating with the deepest portion of the trough. Pipe 25 has its outer end connected by an elbow 26 with two valved pipes 27 and 29.

The operation of the apparatus is as follows: The fish or parts of fish that are to be treated within the apparatus are introduced at the spout h into the tank or receptacle a after the operator has closed the valve e of the receptacle's outlet d and the valve x of the drain-pipe w. The valve u of the air-supply pipe m is normally closed. The valve 9 of the water-supply pipe 8 is normally closed. When the receptacle a has been supplied with a suitable amount of material to be treated, the valve 9 is opened, whereupon water will run from the pipe 8 upon the material within the receptacle a, and such relative quantities of water and fish are introduced into the receptacle as will prevent caking of the solid material in a vertical direction and will cause the said receptacle to be filled too near the latter's upper extremity. Preferably hot water is supplied through the pipe 8. The level of the contents within the receptacle is indicated by the dotted line 31, Fig. I, within the upper portion of the said receptacle. Having supplied the receptacle a with the material to be treated and the solvent-constituting water, the outer tank 10 has its annular chamber 11 supplied with water from the pipe 13 upon opening the valve 14 of the said pipe. The water introduced into the chamber 11 by the pipe 13 is preferably heated in any approved manner before it enters the said pipe. The desired level of water maintained within the chamber 11 is indicated by the dotted line 32, Fig. I, within the upper end of the said chamber. The chamber 11 having been supplied with water from the pipe 13, the valve 17 of the steam-supply pipe 15 is opened, so as to supply steam to the heating-coil 16, and the hot water supplied to the chamber 11 by the pipe 13 is quickly heated to a boiling temperature by the action of the heating-coil 16. The diameter of the receptacle a is preferably about two-thirds of the diameter of the tank 10. In any event the diameter or transverse area of the receptacle a is such relative to the diameter or transverse area of the chamber 11 and the boiling water within the chamber 11 is maintained at such a temperature that the mass of material within the chamber c of the receptacle a shall be heated to and maintained at a comparatively high temperature, but below the boiling-point. A temperature of from 150° to about 200° Fahrenheit is desirable. A temperature as high or above the boiling-point should be avoided in the treatment of the mass of material within the receptacle a, because the treatment of the said material with a temperature as high as or above the boiling-point would result in the conversion of the oil that is to be extracted from the material into an emulsion and would discolor or otherwise injure the oil. During the treatment of the material within the receptacle $a$ with water or other suitable liquid at a suitable temperature below the boiling-point the scum-forming impurities that constitute the lightest portion of the mass rise first and appear and accumulate on top of the mass within the upper end of the receptacle and overflow from the receptacle's upper extremity down the external surface of the upper conical portion $f$ of the said receptacle onto the boiling water in the tank 10. Any matter escaping with the said scum from the receptacle $a$ and heavier than the water within the chamber 11 of the tank 10 descends to the bottom of the said chamber, and that portion of the scum that is lighter than the boiling water is either vaporized or caused to overflow from the top of the boiling water into the trough 23, whence it passes into pipe 25 and thence is conducted off by pipe 27, and of course preparatory to the reception of the scum by the trough the valve 28 of the pipe 27 is opened, if not already opened, and the valve 30 of the pipe 29 is closed, if not already closed. The water-level maintained within the chamber 11 of the tank 10 should be such relative to the trough 23 that such portions of the scum as have not been precipitated within the boiling water nor evaporated upon the boiling water shall be at once conducted to or caused to overflow into the trough 23. The oil extracted from the material within the receptacle $a$ is the next lightest portion of the mass of material undergoing treatment, and consequently rises into the upper end of the receptacle and causes any scum that has not yet overflowed from the receptacle to overflow therefrom. As soon as the scum is removed from the receptacle $a$ and conducted off by the pipe 27 the valve 28 of the said pipe is closed and the valve 30 of the pipe 29 opened. Oil extracted from the material within the receptacle $a$ continues to rise and ultimately overflow from the upper open end of the said receptacle and down the external surface of the upper conical portion $f$ of the receptacle onto the boiling water within the chamber 11 of the tank 10. The steam rising from the boiling water through the oil floating upon the water vaporizes the impurities in the oil. Any foreign matter passing with the oil to the boiling water and heavier than the oil and water descends to the bottom of the chamber 11. The lighter impurities contained in the oil are vaporized, as already indicated, and purified oil overflows from the boiling water into the trough 23. The desired level of boiling water within the chamber 11 can be maintained by such a regulation of the valve 14 of the pipe 13 as will first establish a suitable level and thereupon maintain the said level during the boiling of the water by establishing a continuous flow of water from the pipe 13 into the chamber 11 equal to the quantity of water continually passing off in the form of steam during the operation of the water. The oil is floated on top of the boiling water for about two hours and caused to overflow by causing more water to flow into the chamber 11 from the pipe 13. As soon as the extracted oil that has readily risen has overflowed from the receptacle $a$ without requiring any assistance from an external agency or as soon as the flow of oil from the material undergoing treatment within the receptacle $a$ becomes slow and rises with difficulty on account of the gradual decrease in the quantity of the oil remaining with the material air under pressure is introduced through the pipe $m$ into the lower portion of the chamber of the receptacle $a$ upon opening the valve $u$ of the said pipe, and obviously the provision of the said pipe with the head $n$ and the latter's annular screen causes the air to be discharged laterally into every portion of the lower end of the chamber, and the air discharged from the said head rises into and disintegrates the material and forces the remaining oil or facilitates the flow of oil to the top of the mass within the receptacle $a$. The operation of the apparatus may be continued by so regulating the valve 9 of the water-supply pipe 8 or opening the said valve at suitable intervals of time as to maintain such a level of the mass of material within the receptacle $a$ or to reëstablish the desired level as will accommodate a continuation of the flow of oil from the upper end of the receptacle $a$ until all, or substantially, all of the oil has been extracted from the oil-containing material. The residue remaining in the chamber $c$ of the receptacle $a$ after the separation of the desired oil and the gelatin-forming substance from the mass within the said chamber is drawn off through the outlet $d$ upon opening the valve $e$ and forms guano or fertilizer.

Any solid matter that has accumulated upon the bottom 19 of the chamber 11 of the tank 10 is removable from the said chamber through the pipe 21 upon opening the valve 22 of the said pipe.

The apparatus employed in carrying out the hereinbefore-described improvements in the production of oil from fish or parts of fish or other material constitutes the subject-matter of an application, Serial No. 736,401, filed by me in the United States Patent Office November 9, 1899.

What I claim is—

1. The process of producing oil from material of the character indicated comprising, first, the extraction of the oil from the oil-containing material, and, secondly, the floating of the extracted oil upon a body of boiling water and treating the oil with the steam rising from the body of boiling water to effect the purification of the oil.

2. The process hereinbefore described of producing oil from material of the character indicated, consisting, first, in extracting the oil from the material at a comparatively high temperature lower than 212° Fahrenheit, and, secondly, in removing the extracted oil to a body of boiling water and there permitting the heavier impurities accompanying the oil to settle in the body of water and separating or removing the lighter impurities contained in the oil by vaporizing the said lighter impurities by the steam rising from the body of boiling water.

3. An improvement in producing oil from material of the character indicated, comprising the extraction of the oil from the material by a suitable treatment of the material with a suitable liquid, such, for instance, as water, and the introduction of air into the mass undergoing treatment.

4. An improvement in producing oil from fish and parts of fish, comprising the treatment of the oil-containing material with a suitable liquid, such, for instance, as water, at a suitable temperature below 212° Fahrenheit and introducing air under pressure into the lower portion of the mass undergoing treatment, substantially as and for the purpose set forth.

5. An improvement in producing oil from fish and parts of fish, comprising, first, the extraction of the oil from the oil-containing material and, secondly, floating the extracted oil upon a body of boiling water within a tank or container having an oil-overflow, and maintaining the required level of liquid within the said container by feeding water into the container during the treatment of the oil with the steam rising from the boiling water.

Signed by me at Cleveland, Ohio, this 31st day of October, 1899.

EUGENE R. EDSON.

Witnesses:
   C. H. DORER,
   A. H. PARRATT.